Oct. 20, 1964 K. N. ADDRISON 3,153,322

MAGNETIC AMPLIFIER CIRCUITS

Filed Sept. 6, 1961 2 Sheets-Sheet 1

Inventor
Kenneth Noel Addison

By Karl W. Flocks
Attorney

Oct. 20, 1964 K. N. ADDRISON 3,153,322

MAGNETIC AMPLIFIER CIRCUITS

Filed Sept. 6, 1961 2 Sheets-Sheet 2

Inventor:
Kenneth Noel Addison
By Karl W. Flocks
attorney

United States Patent Office 3,153,322
Patented Oct. 20, 1964

3,153,322
MAGNETIC AMPLIFIER CIRCUITS

Kenneth Noel Addrison, Hatfield, England, assignor to The De Havilland Aircraft Company Limited
Filed Sept. 6, 1961, Ser. No. 136,257
Claims priority, application Great Britain, Sept. 22, 1960, 32,529/60
8 Claims. (Cl. 60—39.28)

This invention relates to magnetic amplifier circuits.

In some applications of magnetic amplifiers, it is desirable that a parameter-affecting device be controlled by the output of an amplifier stage in accordance with a function of the parameter when the parameter is above or below a datum and in accordance with a function of the rate of change of the parameter when the parameter is below or above the datum.

One particular application is the control of gas turbine engines, where the fuel supply is to be controlled as a function of turbine speed, but is to be under the overriding control of engine temperature. Engine temperature must be kept below a datum, which varies with engine speed, in order to avoid the onset of surge, and any rise above the datum is counteracted by an immediate reduction in fuel supply. If, however, the engine temperature is below datum but is rising rapidly a reduction in fuel supply may be necessary to avoid surge, for the engine temperature may continue to rise for an appreciable period after reduction of fuel supply. Further, the speed of the engine may be rising and reaching a value where the engine temperature datum is reduced to avoid surge.

According to the present invention, a magnetic amplifier circuit comprises an amplifier stage having a control winding resistively coupled through a rectifier to a signal input which is capacitatively coupled to a second control winding of the stage, whereby an output signal responsive to rate of change of input signal is obtained with the input signal in one direction and an output signal responsive to input signal with phase change is obtained with input signal in the opposite direction.

Figure 1:
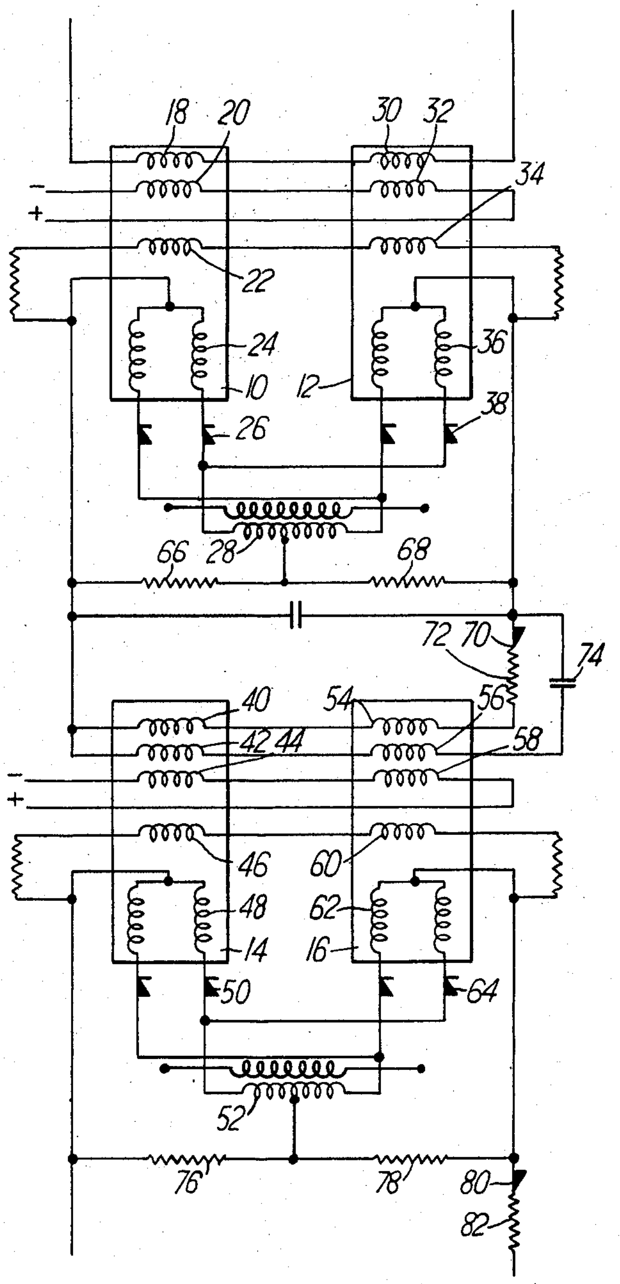
Figure 2:
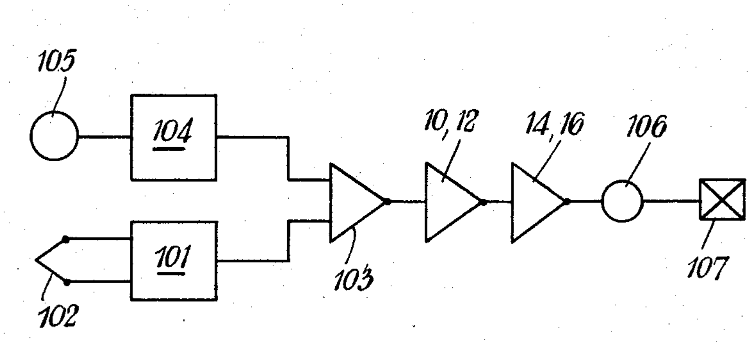

In order that the invention may be more clearly understood, an embodiment thereof will now be described by way of example with reference to the accompanying drawings wherein FIGURE 1 is a circuit diagram of a magnetic amplifier circuit according to the invention for application to a fuel control system for a gas turbine engine and FIGURE 2 is a schematic showing of the circuit used to control a fuel valve.

A complete fuel control system is described and claimed in the specification of application Serial No. 42,585, filed July 13, 1960 and assigned to the assignee of this application and the present circuit is intended for use between a datum comparator circuit, in which signals from thermocouple and datum setting circuits are compared, and a fuel throttle closure circuit. Thus the circuit shown is substituted for the circuit including amplifiers 187, 188, 201 and 202 of FIGURE 5 in that specification.

The magnetic amplifier circuit includes two series-connected stages, the first of which comprises two similar magnetic amplifiers 10 and 12 connected in push-pull and the second of which comprises two similar magnetic amplifiers 14 and 16 also connected in push-pull. The magnetic amplifier 10 has a control winding 18, a bias winding 20, a feed-back winding 22 and output windings 24 connected through rectifiers 26 across a centre-tapped transformer secondary winding 28 from which the A.C. power is derived. The magnetic amplifier 12 similarly has a control winding 30, bias winding 32, a feed-back winding 34 and output windings 36 connected through rectifiers 38 across the secondary winding 28. The windings 18, 20 and 22 of the amplifier 10 are connected in series with the corresponding windings 30, 32, and 34 of the amplifier 12.

The magnetic amplifier 14 has two control windings 40 and 42, a bias winding 44, a feed-back winding 46 and output windings 48 connected through rectifiers 50 across a centre-tapped transformer secondary winding 52 from which the A.C. power is derived. The magnetic amplifier 16 has two control windings 54 and 56, a bias winding 58, a feed-back winding 60 and output windings 62 connected through rectifiers 64 across the secondary winding 52. The windings 40, 42, 44 and 46 of the amplifier 14 are connected in series with the corresponding windings 54, 56 and 60 of the amplifier 16.

The output of the amplifiers 10 and 12 is derived across resistors 66 and 68 and is connected through a rectifier 70 and resistor 72 to the control windings 40 and 54 and through a capacitor 74 to the control windings 42 and 56. The output of the amplifiers 14 and 16 is derived across resistors 76 and 78 and is taken through a rectifier 80 and resistor 82.

The input signal to the amplifiers 10 and 12 is supplied across the control windings 18 and 30 and, in this example is derived as a function of the error between the gas turbine engine temperature and a datum value therefor. A signal representing engine temperature is derived from a thermo-couple circuit 101 connected to an engine temperature sensing thermo-couple 102 and supplied to a comparator 103. The datum value is derived from a datum setting circuit 104 supplied from a tachogenerator 105 with a signal representing compressor speed and operable to produce an output signal which is a variable function of the compressor speed. This datum signal is also supplied to the comparator 103 which produces an output signal having a polarity representing the sense of the departure of the engine temperature from the datum value and a magnitude representing the magnitude of such departure. The comparator output signal is the input signal to the amplifier 10 and 12. The output from the amplifiers 14 and 16 controls an activating motor 106 for a valve 107 controlling the supply of fuel to the engine.

The output signal from the amplifiers 10 and 12 if the engine temperature is below datum is capacitatively coupled to the control windings 42 and 56 of the amplifiers 14 and 16, but is excluded from the control windings 40 and 54 by the rectifier 70. Thus the output signal from the amplifiers 14 and 16 is responsive to the rate of temperature change with the engine temperature below the datum.

If the change is a fall in temperature the rectifier 80 blocks the output signal. Upon a rise in temperature, however, the output signal is passed by the rectifier. If above a predetermined level corresponding to a maximum permissible rate of rise, the resultant output signal acts on the fuel throttle closure circuit to reduce the flow of fuel to the engine and reduce the rate of rise in temperature.

When the engine temperature is above datum, the output signal from the amplifiers 10 and 12 is applied across the control windings 40 and 54 as well as across the control windings 42 and 56, since the rectifier 70 passes the signal. The output signal from the amplifiers 14 and 16 then becomes responsive to engine temperature with some phase advance due to the capacitor 74, and is used to act on the fuel throttle closure circuit to reduce the flow of fuel to the engine and thus to reduce the engine temperature.

It will be understood that the circuit may be used with signals indicative of other parameters to control other parameter-affecting devices. The rectifier may be reversed so as to give a rate of change output signal when the input signal is above datum.

I claim:

1. A magnetic amplifier circuit comprising a magnetic amplifier stage, a control winding associated with said stage, an output winding associated with said stage, a unidirectional current conducting device and a capacitor electrically connected in parallel with said device to form a parallel circuit electrically connected in series with said control winding and operable to block direct current input signals of one polarity to said control winding, pass direct current input signals of the opposite polarity to said control winding and to allow said control winding to respond to the rate of change of direct current input signals.

2. A magnetic amplifier circuit according to claim 1 including a further unidirectional current conducting device connected in series with said output winding and operable to block output signals from said output winding corresponding to a rate of change of input signal of a selected sense.

3. A magnetic amplifier circuit comprising a pair of magnetic amplifiers connected in push-pull and each having first and second input control windings, a bias winding, a feed-back winding and an output winding, the first control windings being connected in series, the second control windings being connected in series, the bias windings being connected in series and the feed-back windings being connected in series, a unidirectional current device connected in series with said first windings, a capacitor connected in series with said second control windings and electrical connections connecting said first windings and said device in parallel with said second windings and said capacitor to form a parallel circuit operable to block direct current input signals of one polarity to said first windings and to cause said second control windings to respond to the rate of change of a direct current input signal of either polarity.

4. A magnetic amplifier circuit according to claim 3 including a further unidirectional current conducting device connected to said output windings and operable to block signals from said output windings corresponding to a rate of change of input signal of a selected sense.

5. A magnetic amplifier circuit comprising first and second magnetic amplifiers connected in push-pull and each having a control winding, a bias winding, a feed-back winding and an output winding, the control windings being connected in series, the bias windings being connected in series and the feed-back windings being connected in series, an alternating current power input transformer having a centre-tapped secondary winding connected across the output windings of each amplifier, a first pair of series connected resistors connected across said output windings, an electrical connection between the junction of said first pair of resistors and the centre-tap of said secondary winding, the output from said first and second magnetic amplifiers being developed across said resistors, third and fourth magnetic amplifiers connected in push-pull and each having first and second control windings, a bias winding, a feed back winding and an output winding, the first control windings of said third and fourth amplifiers being connected in series, the second control windings of said third and fourth amplifiers being connected in series, the bias windings of said third and fourth amplifiers being connected in series and the feedback windings of said third and fourth amplifiers being connected in series, a further alternating current power input transformer having a centre-tapped secondary winding connected across the output windings of each of said third and fourth amplifiers, a second pair of series connected resistors connected across the output windings of said third and fourth amplifiers across which the output from said third and fourth amplifiers is developed, a further electrical connection between the junction of said second pair of resistors and the centre-tap of the secondary winding of said further transformer, a first unidirectional current conducting device connected in series with said first control windings of said third and fourth amplifiers across said first pair of resistors to block a direct current output from said first and second amplifiers of a selected polarity, a capacitor connected in series with the second windings of said third and fourth magnetic amplifiers across said first pair of resistors to cause said second control windings of said third and fourth amplifiers to respond to the rate of change of the output signal from the first and second amplifiers and a second unidirectional current device connected to said second pair of resistors to block output signals from said third and fourth magnetic amplifiers corresponding to a rate of change of output of a selected sense from said first and second amplifiers.

6. An engine control system including means responsive to the magnitude of an engine parameter to produce an electrical input signal representing the magnitude of said parameter, means for applying said input signal to the first and second amplifiers of a circuit according to claim 5 and means responsive to the output from said third and fourth amplifiers to control the fuel supply to the engine.

7. An engine control system comprising means responsive to the departure of engine temperature from a datum value to derive an electrical signal having polarity representing the sense of such departure and a magnitude representing the magnitude of such departure, a magnetic amplifier stage, a first unidirectional current conducting device, a capacitor electrically connected in parallel across said device to form a parallel circuit, means for applying said electric signal through said parallel circuit to the input of said magnetic amplifier stage whereby electric input signals of a selected polarity are blocked and said stage responds to the rate of change of said electric input signals, means responsive to the output of said stage to control the flow of fuel to the engine and a second unidirectional current conducting device connected between said output responsive means and the output of said stage to block output signals corresponding to rate of change of a selected sense of said input signals.

8. An engine control system according to claim 7 wherein said first unidirectional current conducting device is arranged to block input signals representing an engine temperature below a datum and said second unidirectional current conducting device is arranged to block output signals representing a decrease in engine temperature.

References Cited in the file of this patent

UNITED STATES PATENTS

| | | |
|---|---|---|
| 2,959,920 | Brandau | Nov. 15, 1960 |
| 2,971,338 | Bodemuller | Feb. 14, 1961 |

FOREIGN PATENTS

| | | |
|---|---|---|
| 791,288 | Great Britain | Feb. 26, 1958 |
| 838,323 | Great Britain | June 22, 1960 |